Patented Jan. 22, 1946

2,393,450

UNITED STATES PATENT OFFICE 2,393,450

BARIUM-LEAD GLASS HAVING LOW POWER FACTOR

William Houston Armistead, Jr., Corning, N. Y., assignor to Corning Glass Works, Corning, N. Y., a corporation of New York No Drawing. Application July 11, 1944,
Serial No. 544,468

6 Claims. (Cl. 106—53)

This invention relates to glass compositions and has for its primary object to provide a new and useful glass having certain special characteristics making it particularly suitable as an insulating medium for use in electrical condensers for radio circuits. A glass having these characteristics would be a welcome substitute for mica which is ordinarily used for this purpose and which is expensive and requires considerable selection to insure suitable uniformity in quality. Glass, on the other hand, can be manufactured relatively cheaply and with great uniformity in composition and properties. However, no glass has heretofore been devised which combines the desired characteristics to the extent that does the glass herein claimed.

The desired characteristics are:

A power factor less than .07%, as measured at a frequency of one megacycle at room temperature.

A dielectric constant of at least 4 and preferably 7 or 8.

A temperature coefficient less than 100 parts per million per degree centigrade. By temperature coefficient is meant the rate of change of dielectric constant with change of temperature. This is an important requirement since it is desirable that the capacity of a condenser should not change appreciably over the temperature range in which it is to be used. Most glasses do not meet this requirement.

A softening temperature not greater than 800° C., being that temperature at which a thread of glass one millimeter in diameter and twenty-three centimeters long will elongate at the rate of one millimeter per minute when heated throughout the upper nine centimeters of its length.

Any and all of these properties may easily be obtained at the sacrifice of others. Many glasses are known which have low power factors but they lack one or more of the above mentioned properties and hence have not been entirely suitable for use in the insulation of condensers for circuits carrying radio frequency currents. In such circuits the power losses caused by lack of these properties may be quite substantial. The problem solved by me has been to obtain all of the desired properties in one glass.

Pure silica has a very low power factor and also a sufficiently low temperature coefficient for the present purpose but the high fusing point of silica and its extremely high viscosity when fused are well known and preclude its present use. I have found that, when silica is fluxed with boric oxide, lead oxide and barium oxide, compositions may be produced which have low power factors and low temperature coefficients and also relatively low softening points. However, such compositions to a large extent separate into two immiscible phases or compositions on cooling and are so weak structurally that they crumble.

I have found that the addition of 5% to 15% of alumina to such compositions prevents the formation of separate phases and renders all components miscible. At the same time the chemical stability of the glasses is improved, the power factor is decreased, the dielectric constant is increased, and the temperature coefficient is not substantially changed. This result is entirely unexpected, because the introduction of alumina into an alkali containing borosilicate raises the power factor by as much as .02% for every 1% of alumina. The presence of alumina is so effective in maintaining a lower power factor, a high dielectric constant and low temperature coefficient that the silica content can be reduced to a low value or even omitted without losing the benefit of my invention.

In general, my new glasses consist of a homogeneous mixture of 0% to 50% $SiO_2$, 5% to 15% $Al_2O_3$, 10% to 75% $B_2O_3$, and 10% to 40% PbO plus BaO, the ratio PbO/BaO being at least 3 when the total amount of these oxides is high. In other words, when the total PbO and BaO amounts only to about 10%, this ratio may be low, but when their total is in the neighborhood of 40% the ratio PbO/BaO should preferably be at least 3. Such compositions have power factors less than .07%, dielectric constants greater than 4, temperature coefficients less than 100 P. P. M. per degree C., and softening points less than 800° C. If desired, the softening points and power factors can be lowered somewhat further by the introduction of fluorine, preferably by the addition of 5% to 10% of lead fluoride and/or barium fluoride in lieu of the corresponding oxide or oxides.

As examples of glasses in accordance with my invention, the following compositions, calculated in percent by weight from their respective batches together with their properties are given:

|  | 1 | 2 | 3 | 4 | 5 | 6 | 7 | 8 |
|---|---|---|---|---|---|---|---|---|
| $SiO_2$ | 30 | 25 | 50 | 50 | 30 | 30 |  | 30 |
| $Al_2O_3$ | 10 | 15 | 10 | 10 | 10 | 10 | 5 | 10 |
| $B_2O_3$ | 20 | 20 | 30 | 20 | 30 | 30 | 70 | 20 |
| BaO | 10 | 10 | 5 | 10 | 20 | 10 | 10 |  |
| PbO | 30 | 30 | 5 | 10 | 10 | 20 | 15 | 30 |
| $BaF_2$ |  |  |  |  |  |  |  | 10 |
| Power factor, per cent | .070 | .067 | .045 | .060 | .067 | .064 | .058 | .065 |
| Dielectric constant | 7.13 | 7.35 | 4.5 | 5.5 | 6.1 | 6.2 | 5.1 | 7.1 |
| Temp. coeff. ppm. per °C. | 90 | 90 | 64 | 70 | 80 | 80 | 75 | 90 |
| Softening temp. °C | 650 | 688 | 790 | 798 | 667 | 645 | 525 | 642 |
| Expansion coeff. $\times 10^7$ | 50.9 | 50 | 37 | 39 | 49.5 | 47.8 | 67 | 51 |

The values for power factor were measured by the method known as ASTM D-150–42T, set forth on page 1148 et seq., part III of the ASTM standards for 1942. Comparison of glasses 1 and 2 shows that power factor decreases and dielectric constant increases with increase in alumina. Composition 8 contains barium fluoride and shows a slight decrease in power factor and softening point over composition 1 which contains no fluorine but is otherwise similar to composition 8.

Similar compositions containing PbO but no BaO and containing BaO but no PbO are described and claimed in applications Serial Numbers 544,466 and 544,467, respectively, filed by me on this date and assigned to the assignee of this application.

I claim:

1. A glass having a power factor less than .07%, a dielectric constant greater than 4, a temperature coefficient less than 100 parts per million per degree C., a softening point less than 800° C., and consisting of compounds of lead, barium, aluminum, boron and silicon in proportions equivalent to 0% to 50% $SiO_2$, 5% to 15% $Al_2O_3$, 10% to 75% $B_2O_3$, and 10% to 40% (PbO+BaO), the ratio PbO/BaO being at least 3 when the total PbO and BaO is near 40%.

2. A glass having a power factor less than .07%, a dielectric constant greater than 4, a temperature coefficient less than 100 parts per million per degree C., a softening point less than 800° C., and consisting of 0% to 50% $SiO_2$, 5% to 15% $Al_2O_3$, 10% to 75% $B_2O_3$, and 10% to 40% (PbO+BaO), the ratio PbO/BaO being at least 3 when the total PbO and BaO is near 40%.

3. A glass having a power factor less than .07%, a dielectric constant greater than 4, a temperature coefficient less than 100 parts per million per degree C., a softening point less than 800° C., and consisting of compounds of lead, barium, aluminum, boron and silicon in proportions equivalent to 0% to 50% $SiO_2$, 5% to 15% $Al_2O_3$, 10% to 75% $B_2O_3$, and 10% to 40% (PbO+BaO), and a small amount of fluorine, the ratio PbO/BaO being at least 3 when the total PbO and BaO is near 40%.

4. A glass having a power factor less than .07%, a dielectric constant greater than 4, a temperature coefficient less than 100 parts per million per degree C., a softening point less than 800° C., and consisting of 0% to 50% $SiO_2$, 5% to 15% $Al_2O_3$, 10% to 75% $B_2O_3$, and 10% to 40% (PbO+BaO), the ratio PbO/BaO being at least 3 when the total PbO plus BaO is near 40%, and showing by analysis the presence of fluorine.

5. A glass having a power factor less than .07%, a dielectric constant greater than 4, a temperature coefficient less than 100 parts per million per degree C., a softening point less than 800° C., and consisting of compounds of lead, barium, aluminum, boron and silicon in proportions equivalent to approximately 30% $SiO_2$, 10% $Al_2O_3$, 30% $B_2O_3$, 10% BaO, and 20% PbO.

6. A glass having a power factor less than .07%, a dielectric constant greater than 4, a temperature coefficient less than 100 parts per million per degree C., a softening point less than 800° C., and consisting of compounds of lead, barium, aluminum, boron and silicon in proportions equivalent to approximately 30% $SiO_2$, 10% $Al_2O_3$, 20% $B_2O_3$, 30% PbO, and 10% $BaF_2$.

WILLIAM HOUSTON ARMISTEAD, Jr.